United States Patent
Saito et al.

(10) Patent No.: US 7,475,147 B2
(45) Date of Patent: Jan. 6, 2009

(54) INFORMATION PROCESSING APPARATUS AND METHOD, COMPUTER STORAGE MEDIUM, AND PROGRAM

(75) Inventors: Masanori Saito, Kawasaki (JP); Toshiyuki Noguchi, Tokyo (JP); Yutaka Myoki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 768 days.

(21) Appl. No.: 11/051,191

(22) Filed: Feb. 7, 2005

(65) Prior Publication Data

US 2005/0198122 A1 Sep. 8, 2005

(30) Foreign Application Priority Data

Feb. 9, 2004 (JP) ............ 2004-032446
Feb. 1, 2005 (JP) ............ 2005-024705

(51) Int. Cl.
  *G06F 15/16* (2006.01)
(52) U.S. Cl. ..................... 709/227; 709/217
(58) Field of Classification Search ......... 709/226–232, 709/203, 217–219
See application file for complete search history.

(56) References Cited

U.S. PATENT DOCUMENTS

| 6,557,038 | B1 | 4/2003 | Becker et al. ............ 709/227 |
| 2001/0042079 | A1* | 11/2001 | Urban ..................... 707/501.1 |
| 2003/0033429 | A1 | 2/2003 | Myoki ..................... 709/238 |
| 2003/0105795 | A1* | 6/2003 | Anderson et al. .......... 709/101 |
| 2004/0054983 | A1 | 3/2004 | Noguchi ................... 717/100 |
| 2004/0148244 | A1* | 7/2004 | Badeau et al. ............. 705/37 |
| 2004/0254852 | A1 | 12/2004 | Myoki et al. .............. 705/26 |

FOREIGN PATENT DOCUMENTS

| JP | 10-326207 | 12/1998 |
| JP | 11-149449 | 6/1999 |

OTHER PUBLICATIONS

H.W. Cain, et al., "An architectural evaluation of Java TPC-W", High Performance Computer Architecture, 2001. HPCA. The Seventh International Symposium in Monterrey, Mexico, Jan. 19-24, 2001. Los Alamitos, CA, USA, IEEE Comput. Soc. US Jan. 19, 2001, pp. 229-240.
U.S. Appl. No. 11/204,032, filed Aug. 16, 2005.

\* cited by examiner

*Primary Examiner*—Yasin M Barqadle
(74) *Attorney, Agent, or Firm*—Fitzpatrick, Cella, Harper & Scinto

(57) ABSTRACT

This invention has as its object to improve the convenience of a client user when the client establishes communication connection to a server which can improve resources in session management. To this end, in an information processing method according to this invention, a client, which can request a predetermined process to a server via an application while communication connection with the server is established, identifies a field on a display, to which an operation has been made by an input device, generates a dummy request, which includes information required to maintain communication connection, or a request, which includes information required to maintain communication connection and a predetermined processing request, in accordance with the identified field, and transmits the generated request to the server. Even when a predetermined processing request is not made to the server, the client can maintain communications with the server if some operation is made.

10 Claims, 7 Drawing Sheets

| 401 | 402 | 403 |
| --- | --- | --- |
| SESSION ID | LATEST REQUEST TIME | ADDRESS OF SESSION OBJECT |
| 1 | 2003/11/18　10:17:00 | 0x00001234 |
| 2 | 2003/11/18　11:15:00 | 0x00002345 |

INFORMATION PROCESSING APPARATUS AND METHOD, COMPUTER STORAGE MEDIUM, AND PROGRAM

FIELD OF THE INVENTION

The present invention relates to an information processing apparatus which communicates with a server via an application and, more particularly, to a technique associated with session management.

BACKGROUND OF THE INVENTION

Upon building a system that provides various services such as an information service and the like using a database on a WWW for the Internet and intranets, a server often uses session management.

Session management is described in, e.g., Japanese Patent Laid-Open No. 11-149449 or the like. The session management described in this reference will be briefly explained. According to this reference, in a state wherein a server does not use session management (no communication connection is established), a client transmits a request including no session ID to the server. Since the server recognizes that the request from the client does not include any session ID, it creates a session object (information that pertains to a communication method and the like with the client) and a corresponding session ID, and transmits a response including that session ID to the client. After that, the client transmits a request including the session ID sent from the server to the server when it transmits a request to the server. When the request from the client includes the session ID, the server creates a session management with reference to a session object corresponding to the session ID. Note that this reference manages the state of the client for a plurality of requests by holding the state of the client in the session object.

However, with the above method, for example, when the user of the client aborts use of the client while the server creates a session management, the server continues to hold the session object, and the server resources such as the memory that stores the session object cannot be released.

To solve this problem, in servers such as an Internet information server available from Microsoft Corporation, Tomcat available from Jakarta Project and the like, the presence/absence of transmission of a request from the client is monitored, and when no request is received from a predetermined client for a predetermined period of time, a session object is forcibly released to cancel the communication connection, thus improving the use efficiency of the server resources.

With such server, the following problem arises. When the client establishes communication connection to the server with such functionality, if the client does not send any request to the server within a predetermined period of time, the session object is released and communication connection is automatically canceled against the will of the user of the client.

For example, Japanese Patent Laid-Open No. 10-326207 provides a solution in which a program which runs on the client continues to transmit requests required to maintain the session object to the server, thus preventing the session object from being released.

However, according to the method disclosed in Japanese Patent Laid-Open No. 10-326207, the user must recognize and explicitly instruct execution/stop to the program that transmits requests required to maintain the session object. For example, in a state wherein the server creates a session management, if the user of the client aborts a job without quitting the program that transmits requests required to maintain the session object, the session object is uselessly maintained. When a plurality of users share one client, the session object of the previous user is maintained unless the program is temporarily quitted every time the user changes. In light of this, using the method disclosed in Japanese Patent Laid-Open No. 10-326207, indeed the server resources efficient use in session management can be improved, then again the user's convenience is impaired.

SUMMARY OF THE INVENTION

Considering the aforementioned problems, the present invention has as its object to improve the convenience of a client user when the client establishes a communication connection to a server on which efficient resources usage during session management can be improved.

In order to achieve the above object, an information processing apparatus according to the present invention comprises the following arrangement. An information processing apparatus which can request a predetermined process to a server via an application while communication connection with the server is established, comprising:

identification unit configured to identify a field on a display, to which an operation has been made by an input device;

generation unit configured to generate one of a dummy request, which includes information required to maintain communication connection, and a request, which includes information required to maintain communication connection and a predetermined processing request, in accordance with the field identified by the identification unit; and transmission unit configured to transmit one of the dummy request and the request generated by the generation unit to the server.

According to the present invention, when a client establishes a communication connection to a server which can improve resources in session management, the user's convenience of the client can also be improved.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
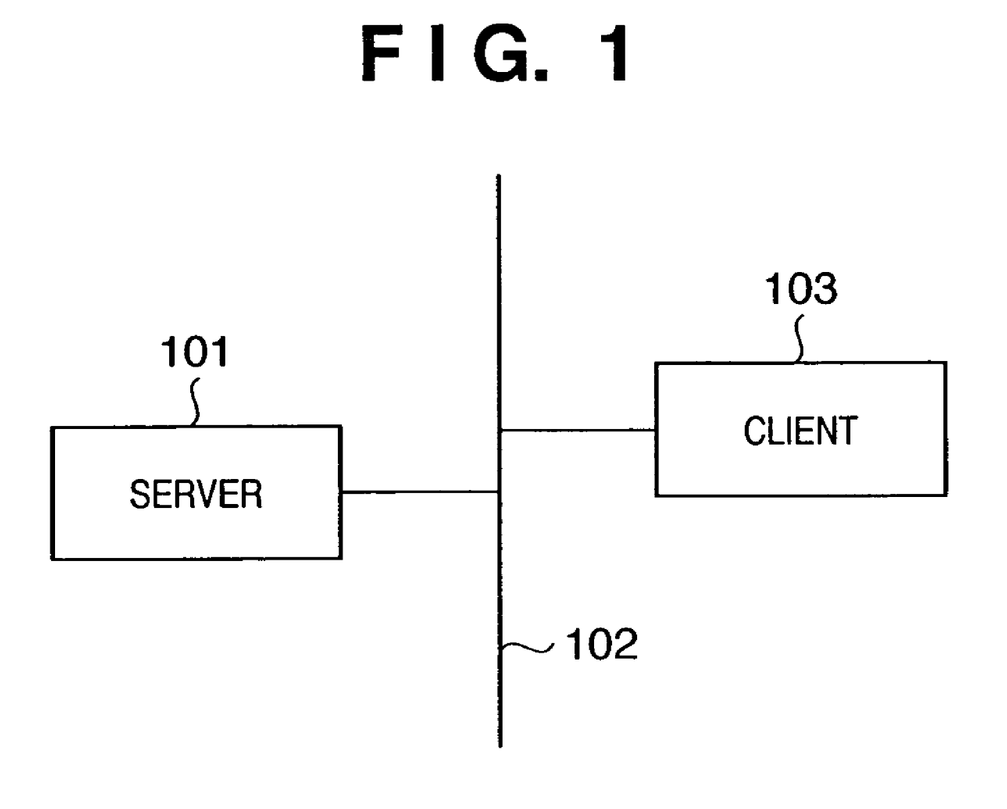
FIG. 1 is a block diagram showing the arrangement of a client-server system which comprises an information processing apparatus (client) according to the embodiments of the present invention.

FIG. 1 shows the arrangement of a client-server system which comprises an information processing apparatus (client computer; to be simply referred to as a client hereinafter) according to an embodiment of the present invention. Referring to FIG. 1, reference numeral 101 denotes a server; and 103, a client computer. The server 101 and client 103 are connected to a network 102 via a network interface. Note that the type of the network 102 is not particularly limited as long as it is a medium that can exchange data and the like via a network interface of a computer.

The respective building components which form the client-server system shown in FIG. 1 will be described in detail below, with reference to FIGS. 2 and 3.

Figure 2:
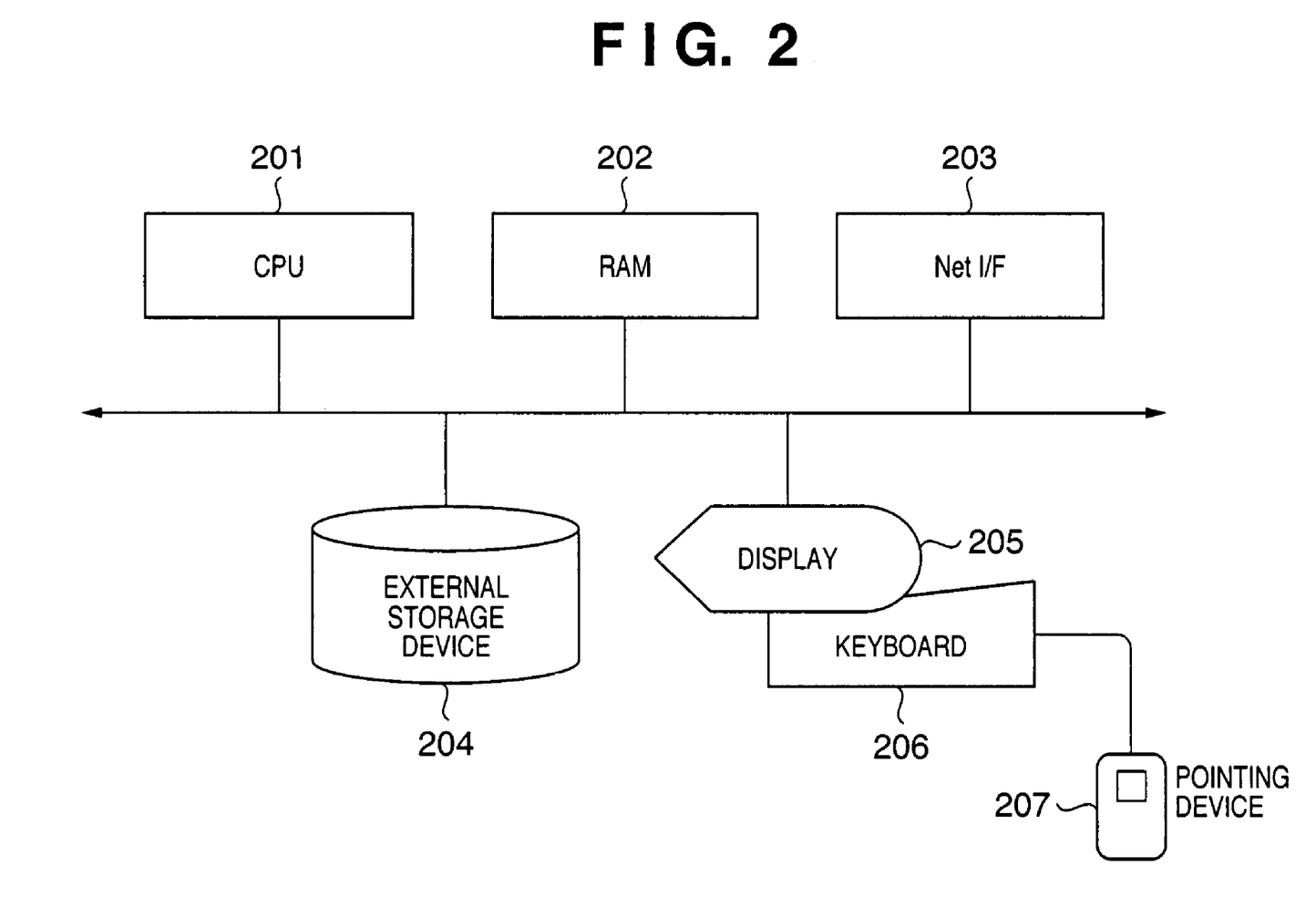
FIG. 2 is a block diagram showing the arrangement of an information processing apparatus (client) or server according to the embodiments of the present invention.

FIG. 2 is a block diagram showing an example of the apparatus arrangement of the server 101 or client 103. Referring to FIG. 2, reference numeral 201 denotes a CPU for controlling the overall apparatus in accordance with a control program stored on a RAM 202; 202, an internal storage unit such as a RAM or the like, which stores the control program of this apparatus to be executed by the CPU 201, document data, a session object required to manage the state of the client 103, and the like; and 203, a network interface which establishes connection to a network such as the Internet and exchanges data and the like under the control of the CPU 201.

Reference numeral 204 denotes an external storage device such as a magnetic disk or the like that saves files. Reference numeral 205 denotes a display; 206, a keyboard; and 207, a pointing device such as a mouse or the like. The control program stored on the RAM 202 uses the functions of an OS (Operating System) stored on the RAM 202 as needed, reads/writes the contents of data to be temporarily saved on the RAM 202, exchanges data via the network interface 203, receives inputs from the keyboard 206 and pointing device 207, and displays on the display 205, thus implementing predetermined operations.

Note that the control program is stored on the RAM 202. Alternatively, the control program may be loaded from the external storage device 204 or may be received via the network interface 203 when it is executed. Although not shown in FIG. 2, the control program may be loaded from a read-only internal storage unit such as a ROM or the like when it is executed.

Furthermore, another input device such as speech input or the like may be equipped in place of or in addition to the keyboard 206 and pointing device 207. All these building components need not always be equipped. In the server 101, the display 205 may be omitted, and the keyboard 206 and pointing device 207 may be shared by other computers in many cases.

Figure 3:
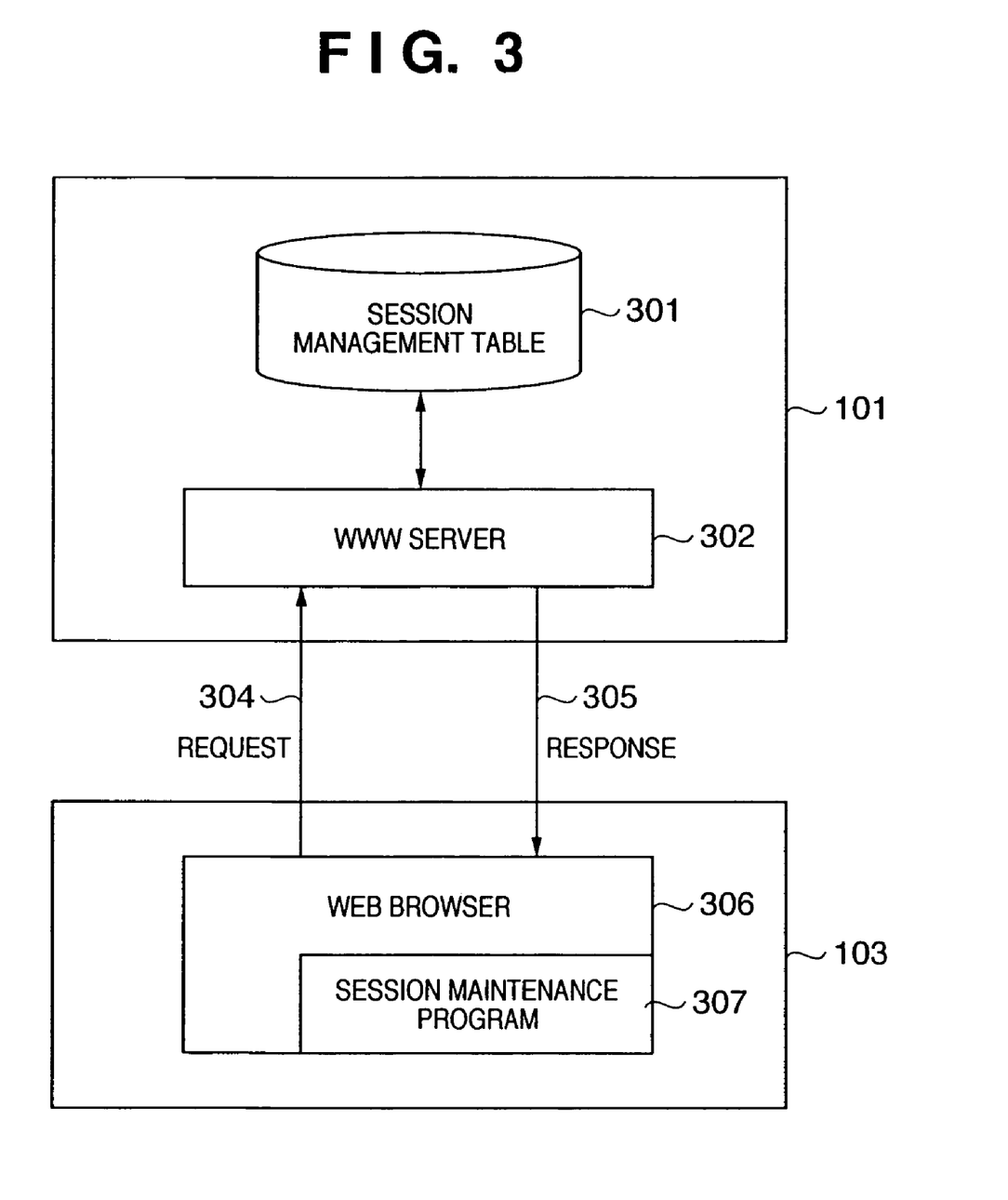
FIG. 3 is a block diagram showing the module arrangement of the server and client.

FIG. 3 is a block diagram showing the arrangement of logical blocks (modules) mainly associated with a session management process of this embodiment in the server 101 and client 103 with the physical arrangement shown in FIG. 2, and the network 102 that connects them.

In the server 101, reference numeral 301 denotes a session management table which is formed on the external storage device 204 or RAM 202. Reference numeral 302 denotes a WWW server which is stored on the RAM 202. The WWW server 302 receives a request 304 transmitted from the client 103 via the network interface 203, and transmits a response 305 to the client 103 via the network interface 203.

In the client 103, reference numeral 306 denotes a Web browser which is stored on the RAM 202. The Web browser 306 transmits a request 304 to the server 101 via the network interface 203, and receives a response 305 transmitted from the server 101 via the network interface 203.

Reference numeral 307 denotes a session maintenance program which is stored on the RAM 202, and runs on the Web browser 306.

Figure 4:
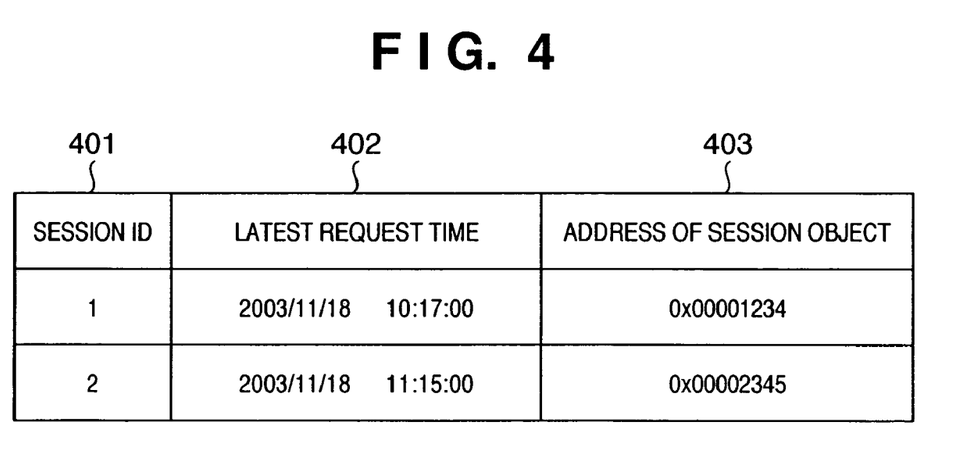
FIG. 4 shows an example of a session management table in the server.

FIG. 4 shows an example of the record configuration of the session management table 301 in the server 101. Reference numeral 401 denotes a session ID which is a code unique to each Web browser 306. Reference numeral 402 denotes a latest request time, which is the latest time of reception of a request from the Web browser 306. Reference numeral 403 denotes an address of a session object. A session object is stored at that address on the RAM 202 in the server 101.

The process executed when the server 101 performs session management for the client 103 will be explained in detail below with reference to FIGS. 5 and 6.

Figure 5:
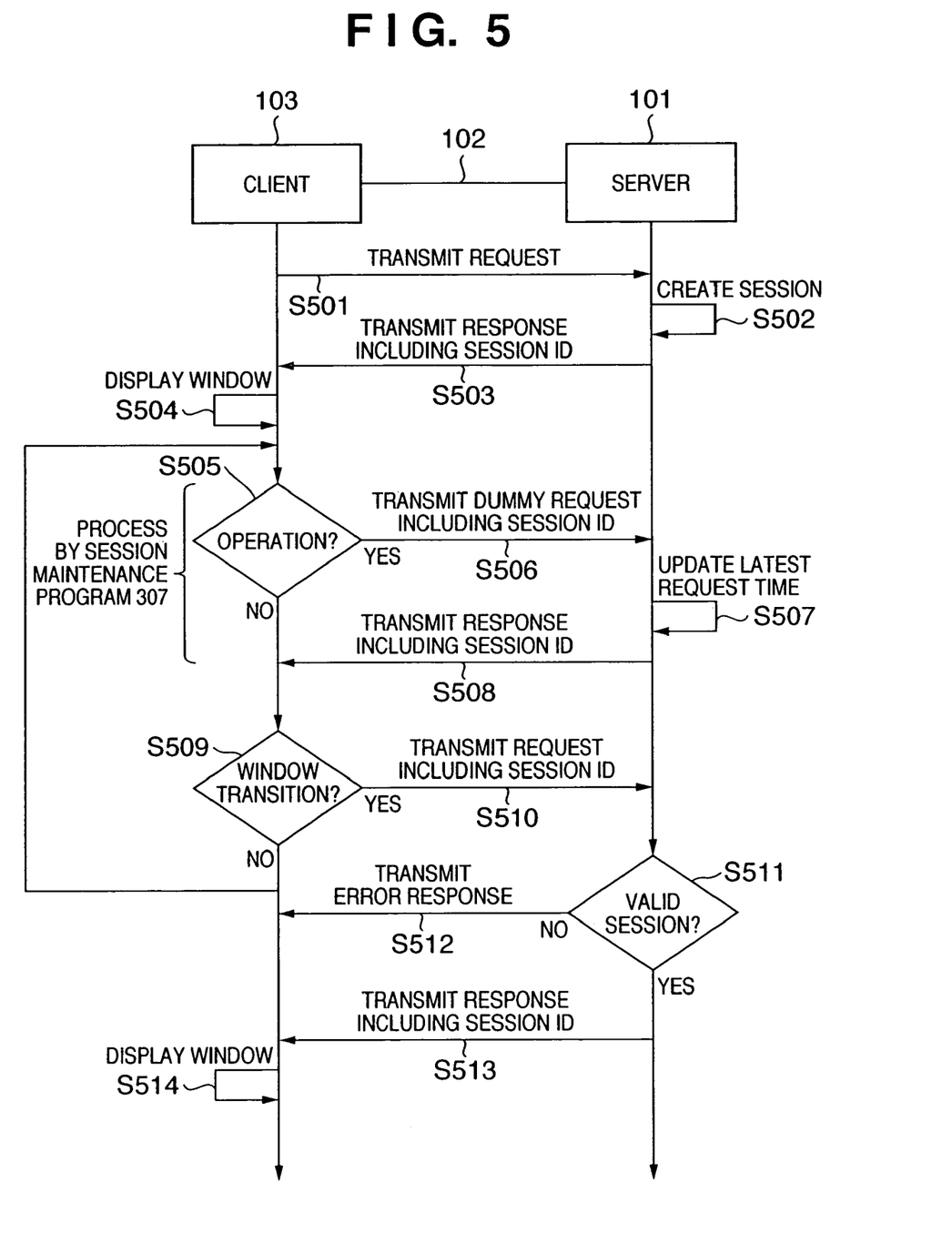
FIG. 5 is a flowchart showing the flow of session management between the information processing apparatus (client) and server according to the embodiments of the present invention.

FIG. 5 shows the sequence of the session management process. When the client 103 does not transmit any request to the server 101, the server 101 does not create any session object corresponding to the client 103, and the client 103 does not undergo session management with the server 101 (no communication connection is established).

If the user of the client 103 instructs the Web browser 306 of the client 103 to transmit a request to the server 101, the Web browser 306 transmits a request that does not include any session ID to the server 101 in step S501. The request is received by the WWW server 302 of the server 101.

In step S502, the WWW server 302 creates a session object and a corresponding session ID, and registers in record 401 the session ID, in record 403 the address of the session object, and in record 402 the current time as a new record of the session management table 301. As a result, the client 103 undergoes session management with the server 101 (communication connection is established).

In step S503, the WWW server transmits a response including the session ID created in step S502 to the client 103. The response is received by the Web browser 306 of the client 103.

In step S504, the Web browser 306 interprets the received response (e.g., an HTML file displayed based on form information transmitted from the WWW server), and displays it on the display 205 of the client 103.

Figure 6:
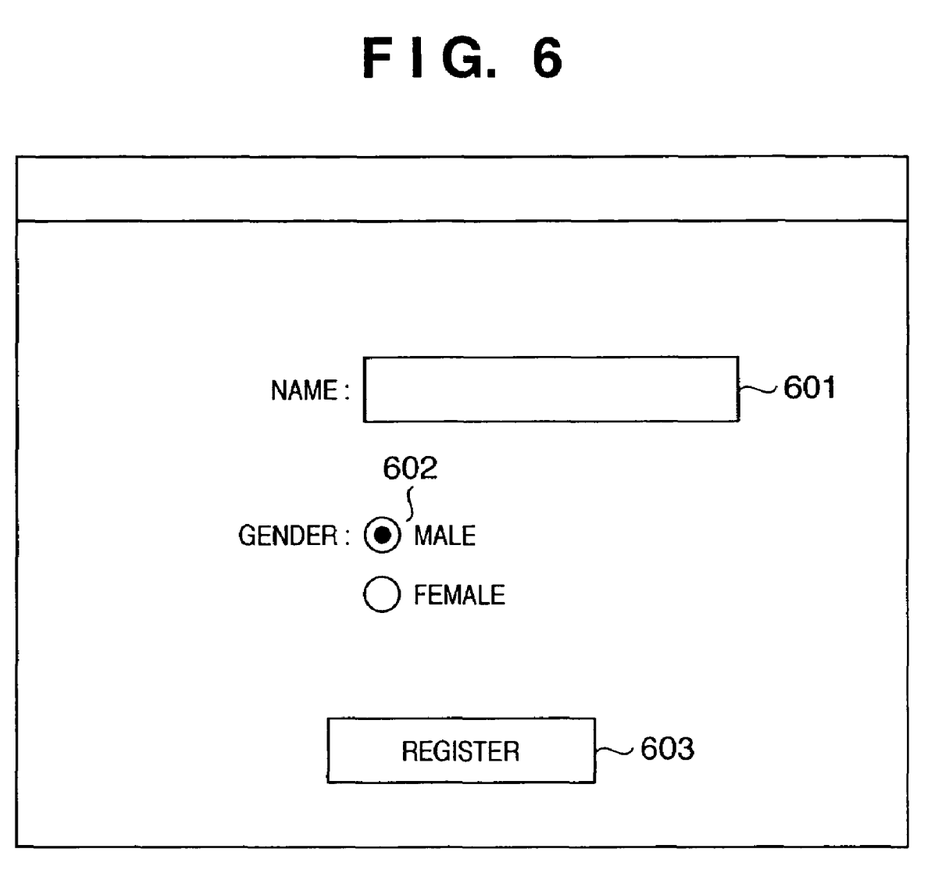
FIG. 6 shows a display example of a Web browser on the client.

FIG. 6 shows an example of a window (an information input window displayed based on form information transmitted from the WWW server) displayed by the Web browser 306. In FIG. 6, reference numeral 601 denotes a field to which text data can be input using the keyboard 206 or the like; and 602 and 603, fields which can be selected by the pointing device 207 or the like. The fields 601 and 602 do not cause any window transition when they are operated by the keyboard 206, pointing device 207, and the like. The field 603 causes window transition when it is selected.

Note that the window transition field makes the Web browser 306 issue a next window request to the WWW server when the field 603 is operated by the keyboard 206, pointing device 207, and the like. On the other hand, the non-window transition field merely displays text data on the Web browser or indicates selection and never transmits a request to the WWW server even when it is operated by the keyboard 206, pointing device 207, and the like.

That is, in a response displayed on the Web browser 306, an operation that controls whether or not to transmit a request (processing request) to the WWW server is defined.

Referring back to FIG. 5, the session maintenance program 307 is executed. It is checked in step S505 if the user of the client 103 has made an operation on the non-window transition field of the displayed window (FIG. 6). That is, it is determined whether or not the operation made by the user corresponds to the defined operation. More specifically, it is checked if the user has made an operation on the field 601 or 602 using the keyboard 206 or pointing device 207 of the client 103. If the operation has been made, the session maintenance program 307 transmits a dummy request (maintenance request signal) including the session ID received in step S503 to the server 101 in step S506. The dummy request is received by the WWW server 302 of the server 101.

In step S507, the WWW server 302 extracts the session ID from the received dummy request, and updates the value of the latest request time 402 of a record that matches the value of the session ID 401 in the session management table 301.

In step S508, the WWW server 302 transmits a response including the session ID extracted in step S507 to the client 103. The response is received by the session maintenance program 307 of the client 103.

If it is determined in step S505 that the user of the client has not made any operation on the non-window transition field (e.g., field 601 or 602), the Web browser 306 checks in step S509 if the user of the client has made an operation on the window-transition field (e.g., field 603). If the user has not made any operation, the user's operation of the client 103 is checked again from step S505.

If it is determined in step S509 that the user of the client has made an operation on the window-transition field (e.g., field 603), the Web browser 306 transmits a request including the session ID received in step S503 to the server 101 in step S510. The request is received by the WWW server 302 of the server 101. Note that this request includes a window switching instruction in addition to the session ID received in step S503.

In step S511, the WWW server 302 extracts the session ID from the received request, and checks if the difference between the current time and the latest request time 402 of a record that matches the value of the session ID 401 in the session management table 301 falls with a predetermined period. If the difference falls outside the predetermined period, the WWW server 302 transmits to the client 103 a response which indicates that the valid period of the session has expired in step S512. The response is received by the Web browser 306 of the client 103.

If it is determined in step S511 that the difference between the latest request time 402 and the current time falls within the predetermined period, a response to the request received in step S509 is transmitted to the client 103 in step S513. The response is received by the Web browser 306 of the client 103.

In step S514, the Web browser 306 interprets the received response, and displays a new window on the display 205 of the client 103.

As can be seen from the description of the session management sequence, in communications with the WWW server, which has the function of releasing the session object and automatically canceling communication connection when the client does not transmit any request within a predetermined period of time while communication connection is established, in order to avoid communication connection from being canceled against the will of the user, even in the case where the user does not make any operation for generating a request to the server but makes some operation (text input or the like), the session maintenance program estimates that the user wants to maintain a communication connection, and thus, transmits a dummy request to the server. As a result, the server receives the dummy request from the client within the predetermined period of time, and does not cancel the communication connection.

In the process shown in FIG. 5, the server 101 monitors whether or not a request is received within a predetermined period of time. However, the present invention is not limited to this. For example, it is checked in step S505 if the user of the client 103 has not made an operation on the non-window transition field in FIG. 6 for a predetermined period of time. If it is determined that the user has not made any operation for the predetermined period of time, a request (a request to cancel communication connection) including the session ID received in step S503 may be transmitted to the server 101 in step S506. In this case, this request is received by the WWW server 302 of the server 101. In step S507, the WWW server 302 extracts the session ID from the received request, and releases the session object at the address 403 of the session object in a record which matches the value of the session ID 401 in the session management table 301.

Figure 7:
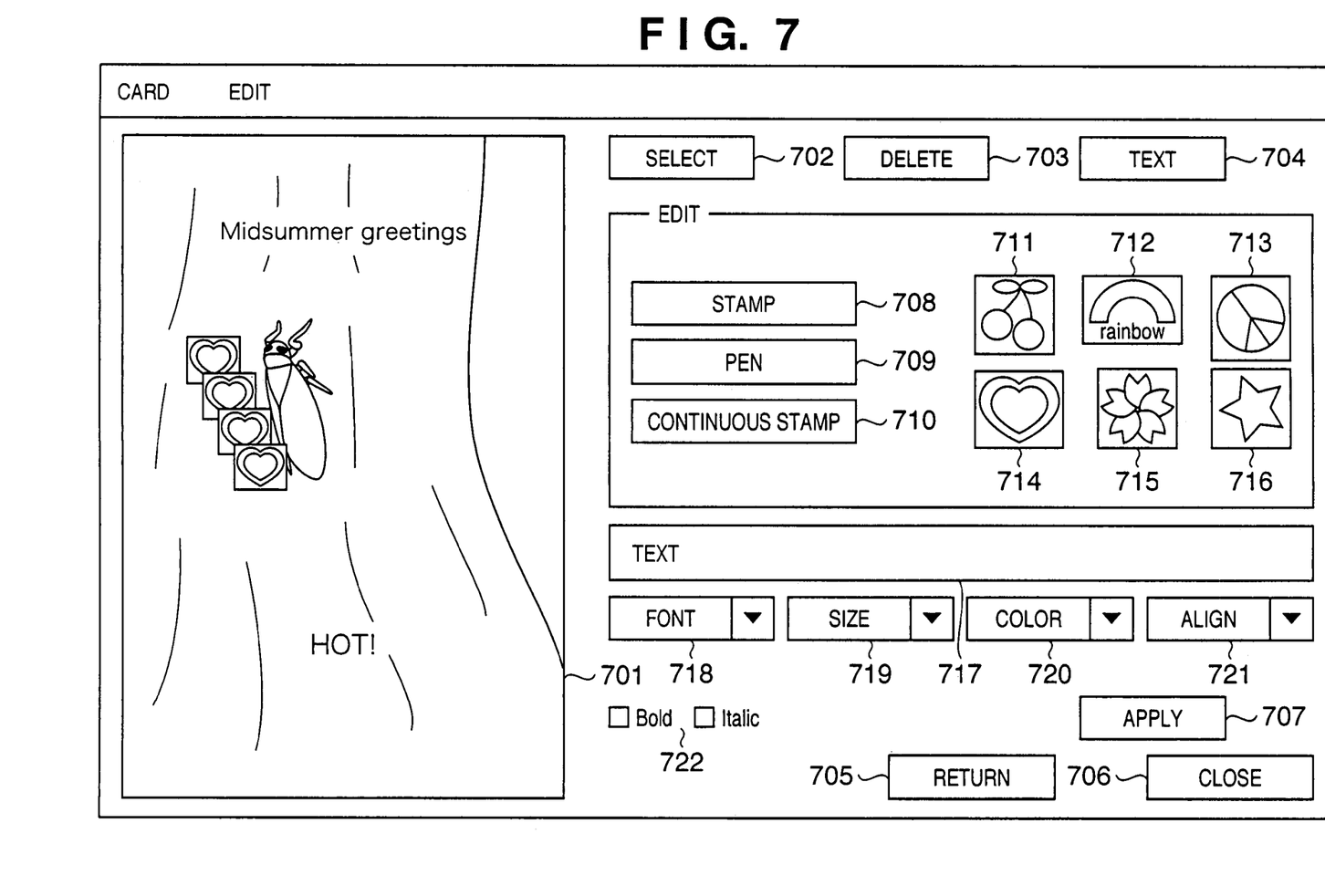
FIG. 7 shows an example of an edit window.

The window to be displayed on the Web browser (the information input window to be displayed based on the form information transmitted from the WWW server 302) may be a window shown in, e.g., FIG. 7. FIG. 7 shows an example of an edit window which is used to edit an image 701 displayed on the left side of the window using a tool group displayed on the right side of the window.

This edit window can be transmitted from the WWW server 302, which provides to the client 103 a service that allows a third party to browse images uploaded from users, a service that prints images uploaded from the user, and binds them up, and the like.

Upon depression of a transmit button 705 on the edit window, the Web browser 306 issues a request to the WWW server 302, and transmits the edit result (information to be transmitted to the WWW server 302). Upon depression of a close button 706, the Web browser 306 issues a request to the WWW server 302, and informs it that the image edit process is aborted. Other buttons and fields to which text data can be input are used to edit the image 701 on the Web browser 306 (edit parameters), and the process can progress without any information from the WWW server 302. However, according to the present invention, in order to maintain a communication between the Web browser 306 and the WWW server 302 even during the edit process to the image, the Web browser 306 transmits a dummy request (maintenance request signal) to the WWW server 101 upon reception of an operation on each of buttons 702 to 704 and 707 to 716 and fields 717 to 722 to which text data can be input.

As can be seen from the above description, according to this embodiment, when communication connection is established to a WWW server which can improve the use efficiency of resources in session management, even when the user does not make any operation for generating a request to the WWW server but makes some operation, a request is transmitted to the server, thus avoiding communication connection with the WWW server from being canceled against the will of the user, and thus, improving the convenience of the client user.

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objectives of the present invention are also achieved by supplying a storage medium, which records a program code of a software program that can implement the functions of the above-mentioned embodiments to the system or apparatus, and by reading out and executing the program code stored in the storage medium by a computer (or a CPU or MPU) of the system or apparatus.

In this case, the program code itself, read out from the storage medium implements the functions of the above-mentioned embodiments, and the storage medium which stores the program code constitutes the present invention.

The storage medium for supplying the program code may be, for example, a floppy® disk, hard disk, optical disk, magneto-optical disk, CD-ROM, CD-R, magnetic tape, non-volatile memory card, ROM, and the like.

The functions of the above-mentioned embodiments may be implemented not only by executing the readout program code on the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code, read out from the storage medium, is written in a memory of the extension board or unit.

The present invention is not limited to the above embodiments and various changes and modifications can be made within the spirit and scope of the present invention. Therefore to apprise the public of the scope of the present invention, the following claims are made.

CLAIM OF PRIORITY

This application claims priority from Japanese Patent Application Nos. 2004-032446 filed on Feb. 9, 2004, and 2005-024705 filed on Feb. 1, 2005, which are hereby incorporated by references herein.

What is claimed is:

1. An information processing apparatus which can request a predetermined process to a server via an application while a communication connection with the server is established, comprising:
   an identification unit that identifies a field on a display, to which an operation has been made by an input device;
   a generation unit that generates one of a dummy request, which includes information required to maintain the communication connection, and a request, which includes information required to maintain the communication connection and a predetermined processing request, in accordance with the field identified by said identification unit; and
   a transmission unit that transmits one of the dummy request and the request generated by said generation unit to the server,
   wherein, when said identification unit identifies that no operation is made to a field of the display of said information processing apparatus by the input device for a predetermined period of time, said generation unit generates a communication cancel request including a processing request for requesting the server to cancel the communication connection, and said transmission unit transmits the generated communication cancel request to the server.

2. The apparatus according to claim 1, wherein a file which is provided by the server and is displayed by the application defines an operation for making the application generate a processing request to the server, and
   said identification unit performs identification by checking if the processing request is defined on the field to which the operation has been made.

3. The apparatus according to claim 1, wherein when the server receives neither the dummy request nor the request for a predetermined period of time while the communication connection is established with said information processing apparatus, the server cancels the communication connection.

4. The apparatus according to claim 1, wherein the server is a WWW server, and the application is a Web browser.

5. An information processing apparatus having a communication unit the communicates with a server, comprising:
   a reception unit that receives, from the server via the communication unit, a form information used to input information to be transmitted to the server;
   a display unit that displays an information input window used to input information from an operator on the basis of the received form information;
   a connection maintenance request signal transmission unit that, when it is detected that information to be transmitted to the server is input to an input field on the information input window, transmits a maintenance request signal of a communication connection with the server;
   a connection cancel request signal transmission unit that, when no operation is made to the input field on the information input window from the operator for a predetermined period of time, transmits to the server a cancel request signal of the communication connection with the server; and
   an input information transmission unit that, when completion of the input of the information in the information input window is instructed, transmits the input information to the server.

6. The apparatus according to claim 5, wherein the server provides a storage service for storing image data, and the information to be transmitted to the server is an edit parameter required to edit the image data stored in the storage service.

7. An information processing method in an information processing apparatus which can request a predetermined process to a server via an application while a communication connection with the server is established, comprising:
   an identification step of identifying a field on a display, to which an operation has been made by an input device;
   a generation step of generating one of a dummy request, which includes information required to maintain the communication connection, and a request, which includes information required to maintain the communication connection and a predetermined processing request, in accordance with the field identified in the identification step; and
   a transmission step of transmitting one of the dummy request and the request generated in the generation step to the server,
   wherein, when it is identified in said identification step that no operation is made to a field on the display of said information processing apparatus by the input device for a predetermined period of time, a communication cancel request including a processing request for requesting the server to cancel the communication connection is generated in said generation step, and the generated communication cancel request is transmitted to the server in said transmission step.

8. An information processing method for an information processing apparatus having a communication unit that communicates with a server, comprising:

a reception step of receiving, from the server via the communication unit, a form information used to input information to be transmitted to the server;

a display step of displaying an information input window used to input information from an operator on the basis of the received form information;

a connection maintenance request signal transmission step of transmitting, when it is detected that information to be transmitted to the server is input to an input field on the information input window, a maintenance request signal of a communication connection with the server;

a connection cancel request signal transmission step of, when no operation is made to the input field on the information input window from the operator for a predetermined period of time, transmitting to the server a connection cancel request signal of the communication connection with the server; and an input information transmission step of transmitting, when completion of the input of the information in the information input window is instructed, the input information to the server.

9. A computer-readable storage medium storing a control program for making a computer implement an information processing method of claim 7.

10. A computer-readable storage medium storing a control program for making a computer implement the information processing method of claim 8.

* * * * *